United States Patent Office

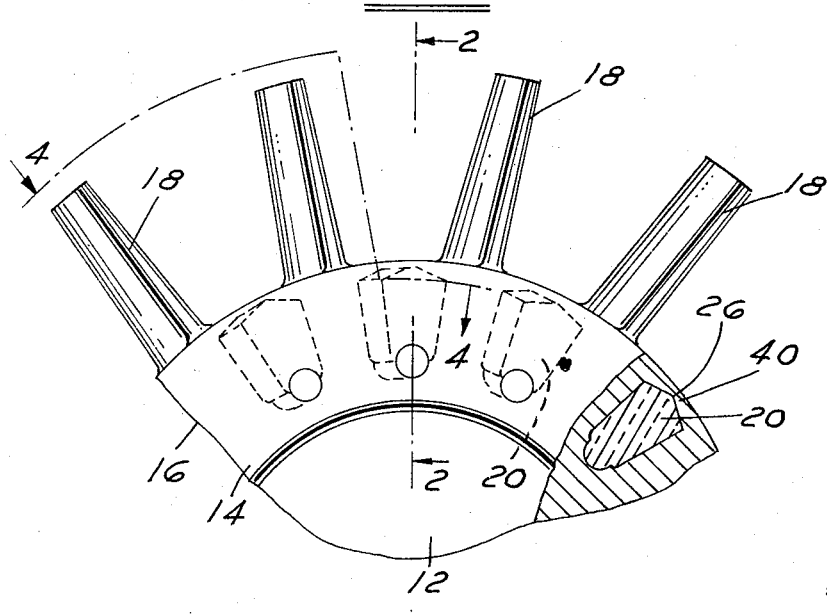
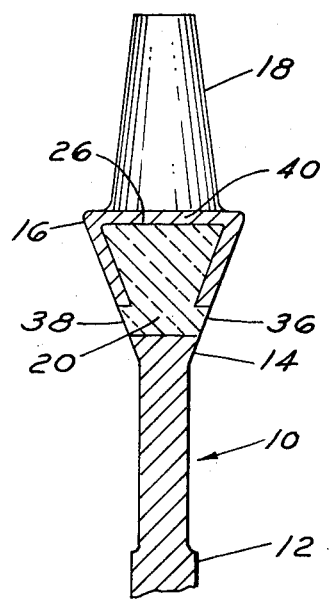
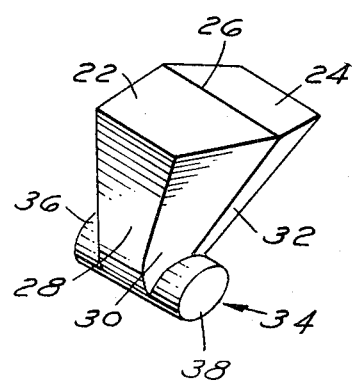
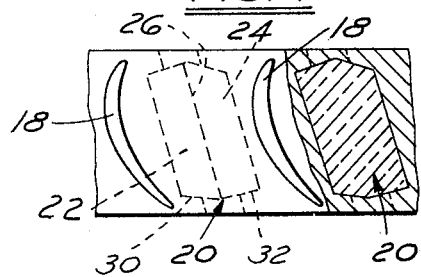

3,664,766
Patented May 23, 1972

3,664,766
TURBINE WHEEL
Christian J. Rahnke, Roseville, Mich., assignor to
Ford Motor Company, Dearborn, Mich.
Filed June 1, 1970, Ser. No. 42,361
Int. Cl. F01d 5/02
U.S. Cl. 416—244
13 Claims

ABSTRACT OF THE DISCLOSURE

A rotor wheel for a gas turbine engine including a disc body having an axially enlarged rim defining the periphery of the body. A plurality of circumferentially spaced blades are carried by the rim and extend radially therefrom. A plurality of circumferentially spaced cores constructed of a light weight high melting point material, for example, ceramic, are positioned in this rim and each of these cores is located circumferentially between a pair of adjacent blades.

BACKGROUND OF THE INVENTION

This invention relates to gas turbine engines, and more particularly, to a rotor wheel for a gas turbine engine.

Gas turbine engine wheels or rotors are formed with a disc-like body having a rim and a plurality of radially extending circumferentially spaced blades mounted or formed thereon. In the usual circumstance, the disc body is formed with a hub for securing the wheel to a rotatable shaft.

In the design of such turbine wheels or rotors, several important factors have in the past been considered and treated by the turbine wheel designer and by the prior art. These factors are: the reduction of the polar moment of inertia in order to provide a quick response by the wheel to the gases of the gas turbine engine impinging on the blades; the design of the wheel to prevent and relieve the thermal stress arising from the exposure of the rim and the blades to the very high temperature of the motive gases and to the extreme temperature ranges encountered between idling and maximum power conditions; and the resonant vibration frequency of the wheel or rotor.

In the past, turbine wheels or rotors have been designed to have a low polar moment of inertia, to confine the thermal stresses caused by the temperature extremes of the motive gases to certain portions of the rim of the wheel and to lower the resonant frequency of the wheel so that this frequency occurs during low speed and low power operating conditions.

These wheels have included a plurality of axially extending apertures or holes positioned in the rim of the wheel with each of these holes being located circumferentially between a pair of adjacent blades. It can be readily appreciated that these plurality of holes reduce the polar moment of inertia, and if located sufficiently near the outer surface of the rim, will confine the thermal stresses induced in the wheel and any cracking that may result to the positions between the blades and the outer surface of the rim. Moreover, it has been believed by certain designers in the field and has been stated in the prior art that these holes reduce the resonant frequency of the wheel by reducing the mass and rigidity of the rotor wheel adjacent the blades. These wheels suffer from the disadvantage of high windage and pumping losses that occur through these holes. Additionally, some power may be lost by virtue of the hot motive gases leaking through these holes rather than providing power to the rotor or wheel by impinging on the blades. In order to overcome these high windage losses, certain prior art devices have employed tubes positioned in the apertures in the wheels with plugs positioned over the ends of the wheels. It can be appreciated that this type of structure is expensive to manufacture by virtue of the large number of parts employed and the large amount of labor that needs to be expended to assemble the structure.

The present invention overcomes the disadvantages mentioned above by providing a plurality of circumferentially spaced cores constructed of a light weight high melting point material, preferably ceramic, which are positioned in the rim of the wheel or rotor and are located circumferentially between a pair of adjacent blades. This structure provides all of the advantages of the prior art wheels, i.e. reduction in the polar moment of inertia, confining the thermal stresses and the resulting cracks, if any, to the surface of the rim intermediate the blades, and the reduction of the resonant frequency of the total wheel structure. Moreover, it prevents any windage or leakage losses through the rim of the wheel, since a smooth and solid surface is presented to the motive gases. Moreover, the wheel is inexpensive and easy to construct since these cores may be cast into the rim of the rotor or wheel during normal casting operations.

SUMMARY OF THE INVENTION

The present invention provides a rotor wheel for a gas turbine engine that includes a disc body with an axially extending enlarged rim defining the periphery of the body. A plurality of circumferentially spaced blades are carried by the rim and extend radially therefrom. A plurality of circumferentially spaced cores constructed of a light weight high melting point material, preferably ceramic, are positioned in the rim and each of these cores is located circumferentially between a pair of adjacent blades. In the preferred embodiment of the invention, these plugs or cores occupy substantially all of the volume of the rim between the adjacent blades of the rotor wheel and they may be constructed of a high temperature ceramic, for example, fused alumina ($Al_2O_3$). Each of the cores may include a lineal apex that is formed by a pair of outwardly extending faces that meet in a location between the blades and closely adjacent to the outer surface of the rim of the rotor body. This lineal apex may extend on a general axial direction of the turbine wheel, and preferably should extend generally parallel to the chords of the turbine blades.

Additionally, the cores or plugs each include a cylindrically shaped means which may be in the form of axially extending bosses positioned at its innermost portion to confine and prevent any cracking caused by thermal stresses to extend to the interior of the wheel. In the preferred embodiment, the main body portion of the core or plug should have an axial thickness less than, but substantially equal to, the axial thickness of the rim so that the majority of the core is covered with the metal of the wheel and rim. The bosses, however, may extend to the exterior of the rim so that they may contact a mold for the wheel or rotor. This provides a means for locating the plugs or cores properly in the mold prior to the time that the metal of the turbine wheel is poured into the mold.

An object of the present invention is the provision of a turbine rotor or wheel which has a low polar moment of inertia, which includes means for confining thermal stresses and which has a relatively low resonant frequency while at the same time having low windage and leakage losses.

A further object of the invention is a turbine wheel which has many advantageous characteristics and can be cast and/or constructed with a minimum number of parts and production operations.

BRIEF DESCRIPTION OF THE DRAWINGS

FIG. 1 is an elevational view, partially in section, of a portion of the turbine rotor or wheel of the present invention;

FIG. 2 is a sectional view, partially in elevation, taken along the lines 2—2 of FIG. 1;

FIG. 3 is a perspective view of the plug or core of the present invention; and

FIG. 4 is a sectional view, partially in elevation, taken along the lines 3—3 of FIG. 1.

DESCRIPTION OF THE PREFERRED EMBODIMENT

Referring now to the drawings in which like reference numerals designate like parts throughout the various views thereof, there is shown in FIG. 1 a turbine wheel or rotor 10 constructed of a high temperature metallic alloy having an enlarged central axially thickened hub 12 which may be employed to connect the turbine rotor or wheel 10 to a rotatable shaft. The rotor or wheel 10 extends radially outwardly from the hub 12 into an axially reduced portion 14, and an axially thickened rim 16 is positioned radially outwardly of the axially reduced portion 14. A plurality of blades 18, which may be formed integrally with the wheel and rim 16, extend radially outwardly therefrom to receive the hot motive gases of an internal combustion engine in which the rotor or wheel 10 is mounted.

A plurality of plugs or cores 20 are positioned in the rim 16 about the circumference thereof and are located in a position intermediate the blades 18. These cores or plugs 20 are constructed of a light weight temperature resistant material that has a higher melting point than the melting point of the metallic alloy employed to construct the remainder of the turbine wheel or rotor 10. As an example, this material should have a melting point in excess of 2300° F. and may be a fused alumina ($Al_2O_3$), a porous ceramic glass material which is glazed at the exterior surface thereof or carbon which may be impregnated with glass.

One of the cores or plugs 20 is shown in perspective in FIG. 3. It includes a pair of outer faces 22 and 24 which are positioned at an obtuse angle with respect to one another so that the intersection thereof forms a lineal apex 26. It may also have a plurality of radially inwardly extending faces which may comprise six in number. Three of these faces 28, 30 and 32 are shown in the perspective view in FIG. 3 and the other side of the core or plug may be formed with similar faces. These faces meet at the radially innermost portion of the ceramic plug or core 20 with a cylindrical shaped portion 34. This cylindrical shaped portion 34 may have axially extending portions in the form of bosses 36 and 38.

As shown in FIG. 4, the cores or plugs 20 are positioned in the rim 16 of the wheel or rotor 10 so that the lineal apex 26 formed at the junction of the faces 22 and 24 extends in a direction generally axially of the axis of the rotor or wheel 10 and generally parallel to the chord of the radially extending blades 18.

In the construction of the turbine wheel 10 of the present invention, the cores of plugs 20 are positioned in a mold with the bosses 36 and 38 of the cylindrical portion 34 extending to the sides of the mold. These bosses provide means for properly locating the cores or plugs 20 wtihin the mold. Molten metal is then cast into the mold around the plurality of plugs or cores 20 to form the turbine rotor or wheel 10. As can best be seen by reference to FIG. 2, the molten metal covers the upper or radial faces 22 and 24 including the lineal apex 26, and also covers the side and radially inwardly extending faces 28, 30 and 32. On the other hand, the ends of the bosses 36 and 38 are free from metal covering.

The cores 20 are, as shown in FIG. 1, sufficiently large to occupy substantially all of the volume of the rim 16 that is positioned intermediate the blades 18. The portions of the rim 16, however, positioned radially inwardly of the blades 18 are free of the ceramic material and are formed integrally with these blades to provide means for transferring the forces exerted on the blades 18 to the remainder of the wheel or rotor 10 including the hub 12.

It can be readily appreciated that the positioning of the cores or plugs 20 intermediate the blades 18 and in the thickened rim 16 substantially reduces the mass of the rim 16 thereby increasing the response of the wheel or rotor 10 to the motive gases by reducing the polar moment of inertia of the rotor or wheel 10. Moreover, the outer surface of the rim 16 has thin sections 40, as shown in FIG. 2, at the lineal apex 26. As the wheel or rotor 10 is heated and cooled cyclically by the motive gases of the gas turbine engine, as occurs between full power and idling conditions, this thin section may bulge radially outwardly. Moreover, if the stresses incurred in the wheel by reason of this alternate heating and cooling are sufficient to crack the rim 16 of the wheel, these cracks will occur in the reduced section 40 along the lineal apex 26. The cylindrical body portion 34 of the ceramic core or plug shapes the metal of the wheel or rotor 10 at this location into a generally cylindrical shape to thereby prevent any cracking occurring at the reduced section 40 from spreading radially inwardly beyond this location.

Since the specific gravity of the material employed to construct the cores or plugs 20 is substantially less than the specific gravity of the metal employed to cast the rotor or wheel 10, the polar moment of inertia is reduced. The resonant frequency of the wheel is also reduced so that this resonant frequency occurs during low speed, low power operating conditions of the wheel or rotor 10.

In addition, it can be appreciated that the sides of the rim 16, i.e. the radially extending sides are smooth and free from any appendages. This prevents any leakage loss through the rim 16 and prevents windage and pumping losses that might otherwise occur and that does occur in certain of the prior art turbine wheels or rotors discussed above.

The present invention has the additional advantage of ease of construction. Since, it is pointed out above, the cores or plugs 20 may be cast integrally with the wheel or rotor 10, no further machining or production operations are necessary. This results in considerable saving of cost in the construction of the wheel.

I claim:

1. A rotor wheel for a gas turbine engine comprising, a disc body, an axially enlarged rim defining the periphery of said body, a plurality of circumferentially spaced blades carried by said rim and extending radially therefrom, a plurality of circumferentially spaced cores constructed of a low weight high melting point material positioned in said rim, each of said cores having axially exposed surfaces being flush with the axial surfaces of said rim whereby the axial surfaces of said rim and said cores are smooth and free of recesses and voids to reduce windage and pumping losses, each of said cores being located circumferentially between a pair of adjacent blades.

2. The combination of claim 1 in which each of said cores has a circumferential length substantially equal to the circumferential spacing between said blades.

3. The combination of claim 1 in which each of said cores comprises a body portion having a generally axially extending lineal apex positioned radially inwardly of the outer surface of said rim, and a cylindrical shaped means positioned radially inwardly of said lineal apex.

4. The combination of claim 1 in which each of said cores has an axial dimension nearly equal to but less than the axial thickness of said rim.

5. The combination of claim 1 in which each of said cores has a circumferential length substantially equal to the circumferential spacing between said blades and an axial dimension nearly equal to but less than the axial thickness of said rim.

6. The combination of claim 1 in which each of said cores comprises a body portion having a circumferential length substantially equal to the circumferential spacing between said blades and an axial dimension substantially equal to the axial thickness of said rim.

7. The combination of claim 6 in which said body portion includes a lineal apex extending generally axially of said wheel and positioned radially inwardly a short distance from the outer surface of said rim, and a cylindrical shaped means positioned radially inwardly of said lineal apex.

8. A rotor wheel constructed of cast metal for use in a gas turbine engine comprising a disc body, an axially enlarged rim defining the periphery of said body, a plurality of circumferentially spaced blades carried by said rim and extending radially outwardly therefrom, a plurality of circumferentially spaced ceramic cores cast in place in said rim, each of said cores having axially exposed surfaces being flush with the axial surfaces of said rim whereby the axial surfaces of said rim and said cores are smooth and free of recesses and voids to reduce windage and pumping losses, each of said ceramic cores located circumferentially between a pair of adjacent blades and occupying a substantial portion of the volume of said rim between said blades.

9. The combination of claim 8 in which each of said ceramic cores includes a portion located adjacent the outer periphery of said rim and being triangular in cross section when viewed in the axial direction of said wheel thereby forming a lineal apex, said lineal apex extending in a general direction with respect to said wheel and generally parallel to the chords of said blades.

10. The combination of claim 9 in which said each of said ceramic cores includes a substantially cylindrical shaped portion having an axis extending in a general axial direction with respect to said wheel and located radially inwardly of said apex and forming the radial innermost portion of said core.

11. The combination of claim 8 in which said cores are constructed of fused alumina.

12. The combination of claim 11 in which each of said ceramic cores includes a portion located adjacent the outer periphery of said rim and being triangular in cross section when viewed in the axial direction of said wheel thereby forming a lineal apex, said lineal apex extending in a general axial direction with respect to said wheel and generally parallel to the chords of said blades.

13. The combination of claim 12 in which said each of said ceramic cores includes a substantially cylindrical shaped portion having an axis extending in a general axial direction with respect to said wheel and located radially upwardly of said apex and forming the radial innermost portion of said core.

References Cited

UNITED STATES PATENTS

| | | | |
|---|---|---|---|
| 2,618,460 | 11/1952 | Williams | 416—213 |
| 2,686,655 | 8/1954 | Schörner | 416—244 X |
| 2,715,011 | 8/1955 | Schörner | 416—241 X |
| 2,819,869 | 1/1958 | Meyer | 416—500 X |
| 3,291,446 | 12/1966 | Huebner | 416—500 UX |
| 3,292,900 | 12/1966 | Pettersen | 416—500 X |

FOREIGN PATENTS

| | | | |
|---|---|---|---|
| 918,326 | 9/1954 | Germany | 416—244 |

EVERETTE A. POWELL, JR., Primary Examiner

U.S. Cl. X.R.

416—241, 500